US012591432B2

(12) United States Patent
Zhang et al.

(10) Patent No.: US 12,591,432 B2
(45) Date of Patent: Mar. 31, 2026

(54) METHOD FOR EXECUTION OF BUS CONTROLLER, COMPUTER DEVICE AND STORAGE MEDIUM

(71) Applicant: ACROVIEW TECHNOLOGY CO., LTD, Guangdong (CN)

(72) Inventors: Zhiping Zhang, Guangdong (CN); Zhijun Li, Guangdong (CN)

(73) Assignee: BEIJING ZITIAO NETWORK TECHNOLOGY CO., LTD., Guangdong (CN)

(*) Notice: Subject to any disclaimer, the term of this patent is extended or adjusted under 35 U.S.C. 154(b) by 153 days.

(21) Appl. No.: 18/713,160

(22) PCT Filed: Oct. 20, 2021

(86) PCT No.: PCT/CN2021/124816
§ 371 (c)(1),
(2) Date: May 23, 2024

(87) PCT Pub. No.: WO2023/039988
PCT Pub. Date: Mar. 23, 2023

(65) Prior Publication Data
US 2025/0021334 A1    Jan. 16, 2025

(30) Foreign Application Priority Data

Sep. 14, 2021    (CN) .......................... 202111072398.6

(51) Int. Cl.
*G06F 9/30* (2018.01)
*G06F 9/32* (2018.01)
(52) U.S. Cl.
CPC ........ *G06F 9/3004* (2013.01); *G06F 9/30189* (2013.01); *G06F 9/321* (2013.01)

(58) Field of Classification Search
None
See application file for complete search history.

(56) References Cited

U.S. PATENT DOCUMENTS 5,057,758 A * 10/1991 Oliver ................ G05B 19/4093
5,371,860 A    12/1994 Mura et al.
(Continued)

FOREIGN PATENT DOCUMENTS

CN    1987699    6/2007
CN    102866982    1/2013
(Continued)

OTHER PUBLICATIONS

Machine Translation of Chinese Patent Application CN 108604185 A, published Sep. 28, 2018. (Year: 2018).*
(Continued)

*Primary Examiner* — Steven G Snyder
(74) *Attorney, Agent, or Firm* — JC ONE WORLD

(57) ABSTRACT

A method and apparatus for the execution of a bus controller, and a bus controller, a computer device and a storage medium. The bus controller is connected to a target device by means of a target bus, the bus controller comprises an instruction memory, which is used to store one or more instructions, and the instructions correspond to one or more bus sub-operations. The method includes: when an instruction execution command is received, acquiring an instruction from an instruction memory; parsing the instruction, and then executing one or more corresponding bus sub-operations; and executing a corresponding control or data operation on a target device by means of the one or more bus sub-operations. By means of writing different instructions into the instruction memory, various types of bus timing, including uncommon and distinct bus timing, may be generated.

15 Claims, 9 Drawing Sheets

(56) References Cited

U.S. PATENT DOCUMENTS

| | | | | | |
|---|---|---|---|---|---|
| 2015/0006663 | A1* | 1/2015 | Huang | .............. | H04L 67/1097 |
| | | | | | 709/213 |
| 2015/0095554 | A1* | 4/2015 | Asnaashari | ......... | G06F 12/0246 |
| | | | | | 711/103 |
| 2016/0299690 | A1* | 10/2016 | Jung | .................... | G06F 3/0688 |
| 2024/0103875 | A1* | 3/2024 | Mehendale | .......... | G06N 3/0464 |

FOREIGN PATENT DOCUMENTS

| | | | | |
|---|---|---|---|---|
| CN | 103472748 | 12/2013 | | |
| CN | 108845829 | 11/2018 | | |
| CN | 108845830 | 11/2018 | | |
| CN | 111444125 | 7/2020 | | |
| CN | 112578755 | 3/2021 | | |
| WO | WO-2009086424 A1 * | 7/2009 | ............ | G06F 13/28 |

OTHER PUBLICATIONS

Machine Translation of Korean Patent Application KR 20160121024 A, published Oct. 19, 2016. (Year: 2016).*

Machine Translation of Korean Patent Application KR 20170121661 A, published Nov. 2, 2017. (Year: 2017).*

Machine Translation of Korean Patent Application KR 102654165 B1, published Aug. 4, 2023. (Year: 2023).*

Machine Translation of German Patent Application DE 102022107178 A1, published Dec. 29, 2022 (Year: 2022).*

Machine Translation of WIPO Publication WO 2024093925 A1, published 2024. (Year: 2024).*

"International Search Report (Form PCT/ISA/210) of PCT/CN2021/124816", mailed on Jun. 20, 2022, with English translation thereof, pp. 1-4.

"Notice of opinion for the first review of China Counterpart Application", issued on Oct. 18, 2022, with English translation thereof, pp. 1-15.

"Notice of the second review opinion of China Counterpart Application", issued on Jan. 19, 2023, with English translation thereof, pp. 1-15.

* cited by examiner

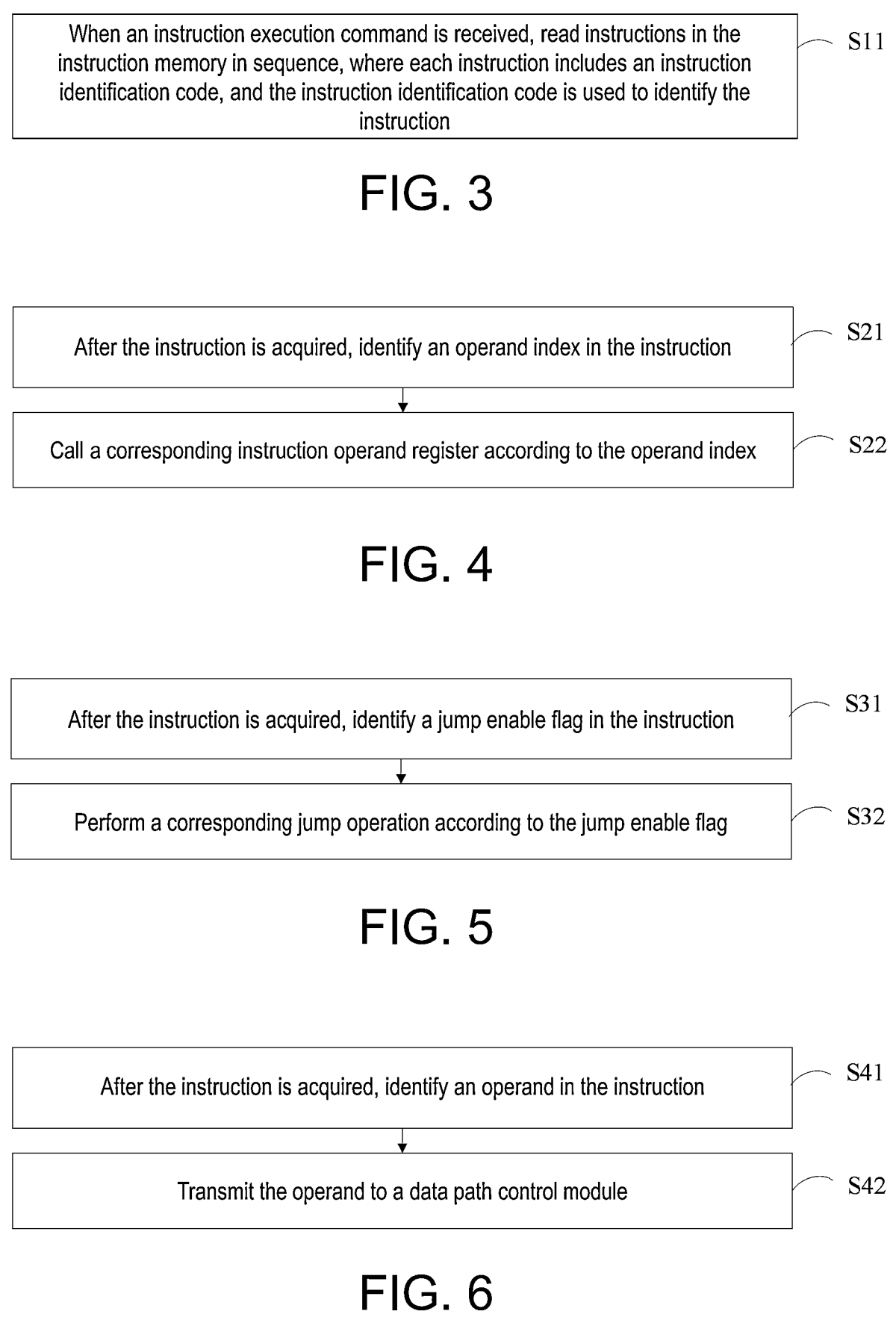

When an instruction execution command is received, read instructions in the instruction memory in sequence, where each instruction includes an instruction identification code, and the instruction identification code is used to identify the instruction — S11

FIG. 3

After the instruction is acquired, identify an operand index in the instruction — S21

Call a corresponding instruction operand register according to the operand index — S22

FIG. 4

After the instruction is acquired, identify a jump enable flag in the instruction — S31

Perform a corresponding jump operation according to the jump enable flag — S32

FIG. 5

After the instruction is acquired, identify an operand in the instruction — S41

Transmit the operand to a data path control module — S42

FIG. 6

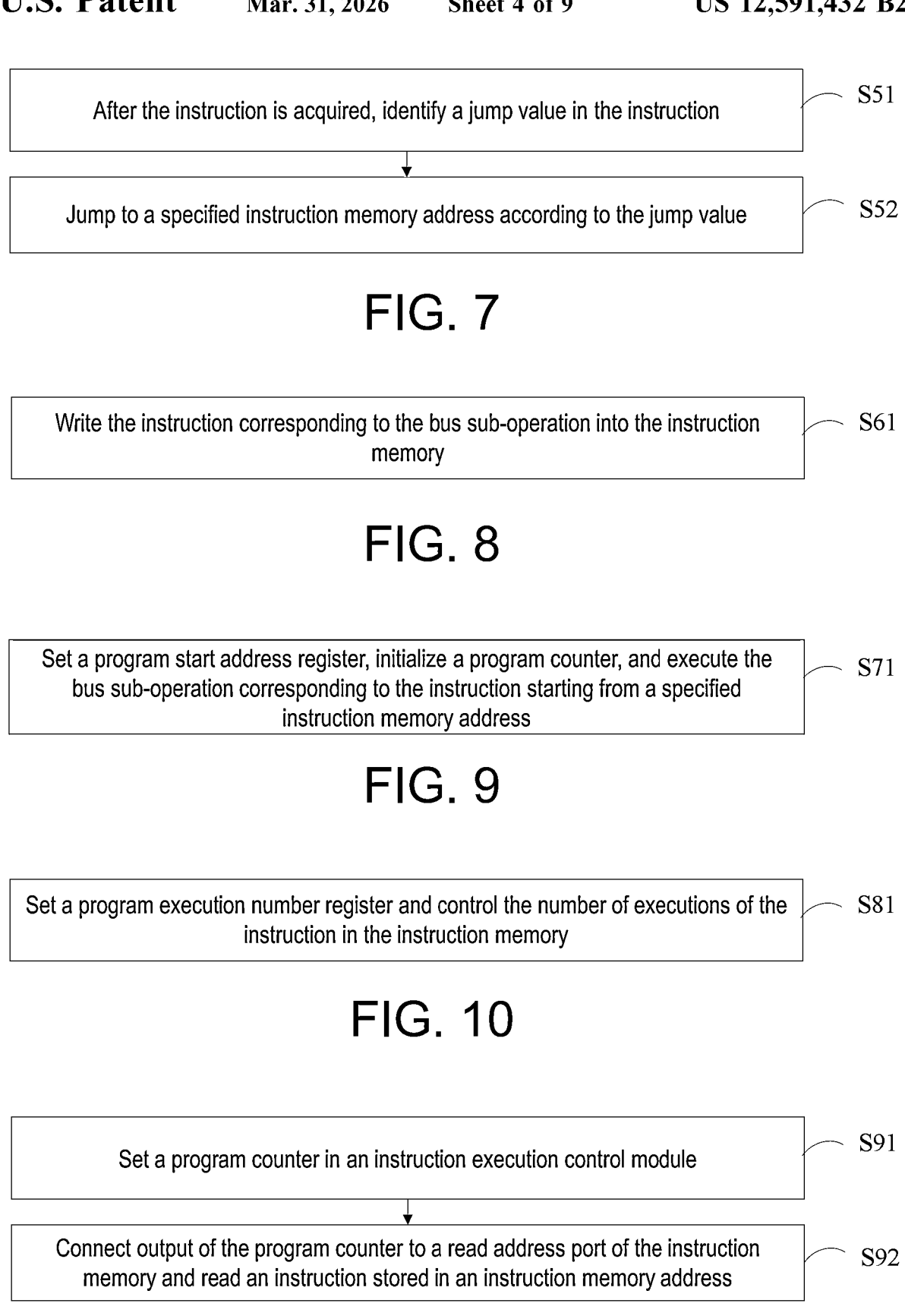

After the instruction is acquired, identify a jump value in the instruction ⟋⌒ S51

Jump to a specified instruction memory address according to the jump value ⟋⌒ S52

FIG. 7

Write the instruction corresponding to the bus sub-operation into the instruction memory ⟋⌒ S61

FIG. 8

Set a program start address register, initialize a program counter, and execute the bus sub-operation corresponding to the instruction starting from a specified instruction memory address ⟋⌒ S71

FIG. 9

Set a program execution number register and control the number of executions of the instruction in the instruction memory ⟋⌒ S81

FIG. 10

Set a program counter in an instruction execution control module ⟋⌒ S91

Connect output of the program counter to a read address port of the instruction memory and read an instruction stored in an instruction memory address ⟋⌒ S92

METHOD FOR EXECUTION OF BUS CONTROLLER, COMPUTER DEVICE AND STORAGE MEDIUM

CROSS-REFERENCE TO RELATED APPLICATION

This application is a 371 of international application of PCT application serial no. PCT/CN2021/124816, filed on Oct. 20, 2021, which claims the priority benefit of China application no. 202111072398.6, filed on Sep. 14, 2021. The entirety of each of the above-mentioned patent application is hereby incorporated by reference herein and made a part of this specification.

TECHNICAL FIELD

The present disclosure relates to the field of computer technology, and in particular, to a method for execution of a bus controller, a computer device, and a storage medium.

DESCRIPTION OF RELATED ART

The currently-available bus controllers, such as I2C, SPI, SWD, BDM, and other bus controllers, are generally designed using the following two design methods. One is a software simulation design method, and the other is a logic circuit design method.

The software simulation design method has low hardware requirements and can be implemented using GPIO on the simplest embedded system. For instance, the MCU generates bus timing by controlling one or more GPIOs to pull high or low, to delay, etc., so as to communicate with the target device. This method simulates the bus timing through the MCU program, so the bus controller is easy to modify and has a certain degree of flexibility, but this method also has the following obvious shortcomings:

First, bus timing is difficult to control accurately. The execution process of the MCU program is affected by many factors, such as interrupts, compiler optimization of the program, system task scheduling, etc., causing the bus timing to be unable to be accurately controlled and resulting in unstable phenomena such as bus data sampling errors. Secondly, due to the limited maximum operating frequency of the bus, high performance cannot be achieved, and it is difficult to implement a more complex bus controller. When the bus controller being simulated has many interface signals and the relationship between the signals is more complex, the complexity and code amount of the MCU simulation program increase significantly. The complexity of the simulated bus controller is thereby limited.

The logic circuit design method is another common bus controller design method. The so-called logic circuit design method uses digital logic circuits to implement bus controllers. Hardware description languages such as Verilog and VHDL are used most of the time to design bus controllers, which can be implemented and run on FPGA, ASIC, SOC, and other hardware. Generally, a bus controller designed using this approach is connected to the system via a local bus. The MCU has access to a bus-controlled register group through the local bus, so as to complete functions such as configuring the bus controller, controlling the operation of the bus controller, acquiring the operating status of the bus controller, transmitting data to the bus controller, and acquiring data from the bus controller. The main disadvantage of this type of bus controller is its lack of flexibility because this type of bus controller is hard-coded in many places and has limited configurability, so it is unable to generate various bus timings with large differences. Especially for some non-standard buses, the devices of various manufacturers are considerably different, but this type of bus controller is difficult to be compatible with most devices.

SUMMARY

The present disclosure discloses a method for execution of a bus controller. The bus controller is connected to a target device by means of a target bus. The bus controller includes an instruction memory, the instruction memory is used to store at least one instructions, and the instruction corresponds to one or more bus sub-operations. The method includes the following blocks.

In response to receiving an instruction execution command, acquiring a target instruction of the at least one instruction from the instruction memory.

The target instruction is parsed, and then one or more corresponding bus sub-operations are executed.

A corresponding control or data operation on a target device is executed by means of the one or more bus sub-operations.

In some embodiments, the bus controller is connected to a host through a local bus.

In some embodiments, the bus sub-operation includes sending reset timing, sending operation start timing, sending an operation command, sending a read and write flag bit operation, sending an address operation, sending a data operation, sending operation end timing, receiving a response bit operation, and receiving a data operation.

In some embodiments, the instruction forms an instruction system.

In some embodiments, in response to receiving the instruction execution command, acquiring the target instruction of the at least one instruction from the instruction memory includes the following blocks.

In response to receiving the instruction execution command, instructions in the instruction memory are read in sequence. Each instruction in the instruction memory includes an instruction identification code, and the instruction identification code is used to identify the instruction in the instruction memory.

In some embodiments, the target instruction includes an operand index, and the method includes the following blocks.

In response to the target instruction is acquired, an operand index in the target instruction is identified.

An instruction operand register which corresponds to the operand index is called.

In some embodiments, the target instruction includes a jump enable flag, and the method includes the following blocks.

In response to the target instruction is acquired, a jump enable flag in the target instruction is identified.

A corresponding jump operation is performed according to the jump enable flag.

In some embodiments, the method includes the following blocks.

In response to the target instruction is acquired, an operand in the target instruction is identified.

The operand is transmitted to a data path controller.

In some embodiments, the method includes the following blocks.

In response to the target instruction is acquired, a jump value in the target instruction is identified.

Jumping to a specified instruction memory address is performed according to the jump value.

In some embodiments, the target instruction includes a reserved field, and the reserved field is used to extend the target instruction.

In some embodiments, the method further includes the following block.

The target instruction corresponding to the bus sub-operation is written into the instruction memory.

In some embodiments, the method further includes the following block.

A program start address register is set, a program counter is initialized, and the bus sub-operation corresponding to the target instruction is executed starting from a specified instruction memory address.

In some embodiments, the method further includes the following block.

A program execution number register is set, and the number of executions of the target instruction in the instruction memory is controlled.

In some embodiments, the method includes the following blocks.

A program counter is set in an instruction execution controller.

Output of the program counter is connected to a read address port of the instruction memory, and an instruction stored in an instruction memory address is read.

In some embodiments, the bus controller includes registers, and the registers include a control register, a status register, a bus configuration register, an instruction operand register, a storage control register, and an interruption register.

The present disclosure discloses a computer device including a memory and a processor. The memory stores a computer program, and the processor implements the steps of the abovementioned method for the execution of the bus controller when implementing the computer program.

The present disclosure discloses a computer-readable storage medium storing a computer program, characterized in that the computer program executes the blocks of the method for the execution of the bus controller when being executed by a processor.

BRIEF DESCRIPTION OF THE DRAWINGS

To make the technical solutions provided in the present disclosure more clearly illustrated, several accompanying drawings required by the embodiments for description are briefly introduced as follows. Obviously, the drawings in the following description are merely some embodiments of the present disclosure, and for a person having ordinary skill in the art, other drawings can be obtained based on these drawings without inventive effort.

FIG. 3 is a schematic flow chart of a block of instruction acquisition according to some embodiments of the present disclosure.

FIG. 4 is a schematic flow chart of blocks of instruction acquisition according to some embodiments of the present disclosure.

FIG. 5 is a schematic flow chart of blocks of instruction acquisition according to some embodiments of the present disclosure.

FIG. 6 is a schematic flow chart of blocks of operand transmission according to some embodiments of the present disclosure.

FIG. 7 is a schematic flow chart of blocks of instruction memory address jump according to some embodiments of the present disclosure.

FIG. 8 is a schematic flow chart of a block of instruction writing according to some embodiments of the present disclosure.

FIG. 9 is a schematic flow chart of a block of execution of a bus sub-operation according to some embodiments of the present disclosure.

FIG. 10 is a schematic flow chart of a block of controlling the number of executions according to some embodiments of the present disclosure.

FIG. 11 is a schematic flow chart of blocks of instruction reading of an instruction memory address according to some embodiments of the present disclosure.

DESCRIPTION OF THE EMBODIMENTS

In order to make the technical problems, technical solutions, and beneficial effects solved by the present disclosure clearer, the present disclosure is further described in detail in the following paragraphs with reference to the accompanying drawings and embodiments. It should be understood that the embodiments described herein serve to explain the present disclosure merely and are not used to limit the present disclosure.

One of the core concepts of the present disclosure is that compared to the fixed characteristics of conventional bus operations (i.e., in conventional bus controllers, a bus operation is fixed, is not to be split into smaller processes that can be controlled by instructions, does not have an instruction system, and cannot be programmed), a mapping relationship between one or more instructions and one or more bus sub-operations is established in the present disclosure, and a bus operation composed of the bus sub-operations is implemented through an instruction set (i.e., a combination of a plurality of instructions). Herein, the bus operation can be customized or can be a variety of full-featured bus operations, and the bus timing is accurate, stable, and fast. The problems of poor flexibility and poor compatibility of found in conventional logic circuit design are also solved.

Figure 1:
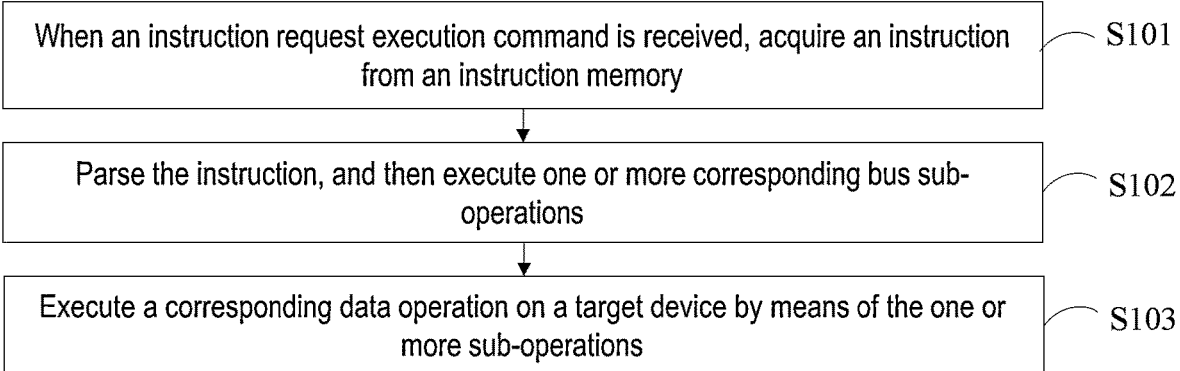
FIG. 1 is a flow chart of a method for execution of a bus controller according to an embodiment of the present disclosure.

With reference to FIG. 1, a flow chart of a method for execution of a bus controller according to an embodiment of the present disclosure is shown. The bus controller is connected to a target device by means of a target bus. The bus controller includes an instruction memory, the instruction memory is used to store one or more instructions, and the instructions correspond to one or more bus sub-operations executed by the following blocks. The following blocks may be included:

In block 101, when an instruction execution command is received, an instruction from an instruction memory is acquired.

In the present disclosure, the bus controller may be connected to a host through a local bus, and on the other hand, it can be connected to the target device by means of the target bus. The host is a computer, an embedded system, or any other control system with a local bus used to control the operation of the bus controller. The local bus can be AXI, AXI-Lite, AHB, APB, Wishbone, and other types of buses. The target bus refers to the bus controlled by the bus controller, and its type can also be multiple different types of buses. The target device may include a chip, a circuit board, an external device, etc., which is not particularly limited by the present disclosure.

Figure 2:
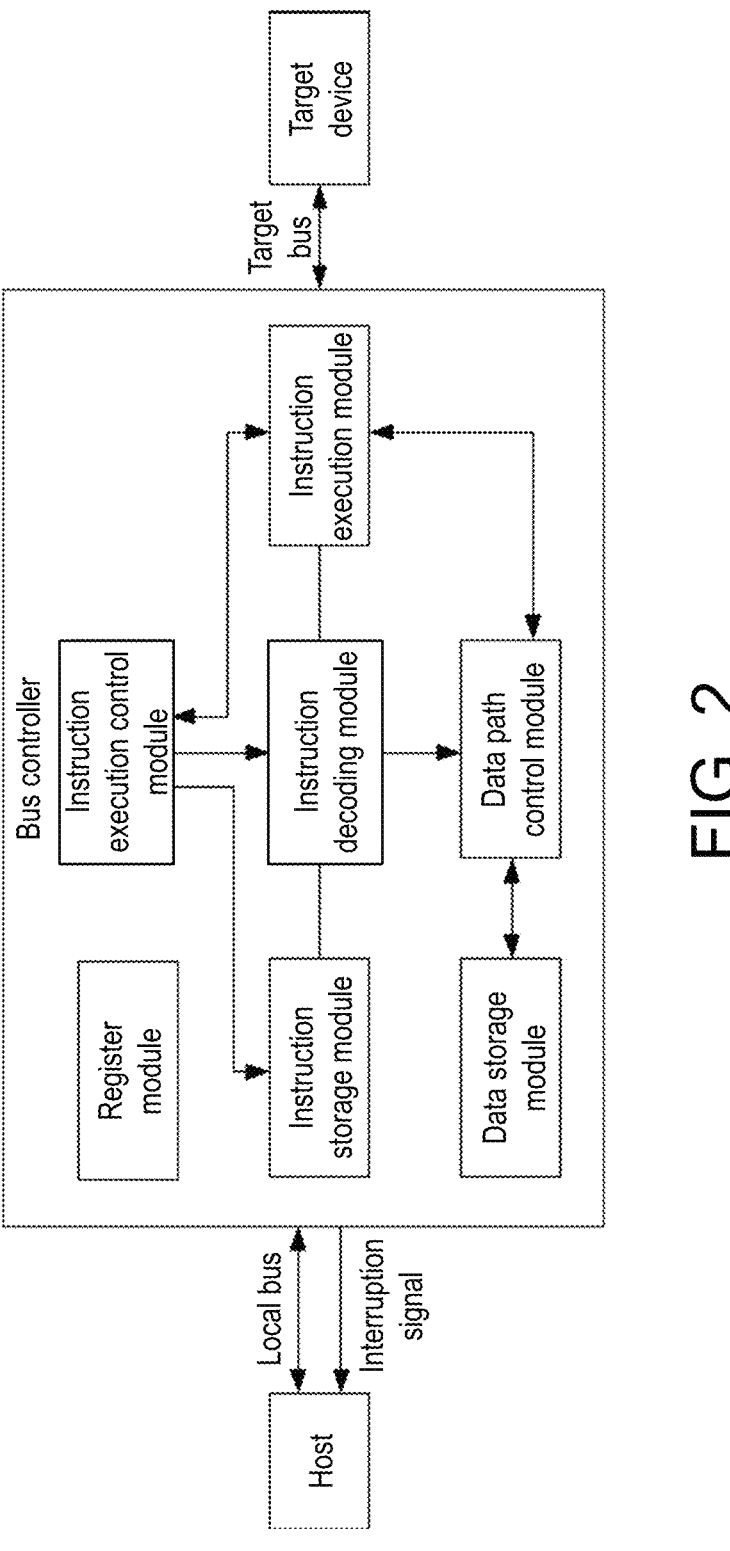
FIG. 2 is a schematic diagram of a bus controller system according to some embodiments of the present disclosure.

With reference to FIG. 2, a schematic diagram of a bus controller system according to some embodiments of the present disclosure is shown. As shown in FIG. 2, the bus controller is connected to the host by means of the local bus and is connected to the target device by means of the target bus. The bus controller may include a register module. In the present disclosure, the bus controller may also be divided into logically divided modules such as an instruction execution control module, an instruction storage module, an instruction decoding module, an instruction execution module, a data storage module, and a data path control module, which is not particularly limited by the present disclosure. It should be noted that the register module is connected to the instruction execution control module, the instruction storage module, the instruction decoding module, the instruction execution module, the data storage module, and the data path control module (not shown in FIG. 2).

In practical application of the present disclosure, the host controls the operation of the bus controller through the local bus. Herein, the bus controller includes the instruction memory, etc., and the instruction memory is used to store one or more instructions, and each instruction corresponds to one or more bus sub-operations. When the host instructs the bus controller to start performing an operation, the bus controller (under the control of the instruction execution control module) begins to sequentially read the instructions in the instruction memory and decode them for execution.

A bus sub-operation refers to an operation that further divides the bus operation. For instance, the bus sub-operation may include sending reset timing, sending operation start timing, sending an operation command, sending a read and write flag bit operation, sending an address operation, sending a data operation, sending operation end timing, receiving a response bit operation, and receiving a data operation. Certainly, other bus sub-operations may also be included, which is not particularly limited by the present disclosure. There is a corresponding relationship between the instruction and the bus sub-operation, and each instruction in the instruction set implements different bus sub-operations in bus operation timing. Different bus sub-operations of the bus timing can be flexibly combined through different combinations of the instructions, and various bus operation timings with complete functions are thus implemented.

In block 102, the instruction is parsed, and one or more corresponding bus sub-operations are then executed.

In application of the present disclosure, after the instruction is acquired, the instruction is decoded, and one or more bus sub-operations corresponding to the instruction are executed. For instance, the bus sub-operations corresponding to the above instruction are the sending reset timing and the sending operation start timing, so that two bus sub-operations: the sending reset timing and the sending operation start timing, may be acquired according to the instruction.

In some embodiment of the present disclosure, each instruction may correspond to one bus sub-operation, so a complete bus operation may be completed through multiple instructions.

In the present disclosure, the instruction execution module generates bus static parameters such as a bus clock frequency, controls setup and hold time of sent data, and controls sampling time of received data according to the settings of a bus configuration register.

Further, target bus timing corresponding to the instruction is generated based on an instruction identification code and an operand passed by the instruction decoding module, an operand passed by the data path control module, and control information passed by the instruction execution control module. That is, one or more corresponding bus sub-operations are generated.

In block 103, a corresponding control or data operation on a target device is executed by means of the one or more bus sub-operations.

In the present disclosure, after the instruction is acquired, the corresponding bus sub-operation is found through the mapping relationship. The corresponding control or data operation, such as reading data or writing data, is performed on the target device according to the bus sub-operation, which is not particularly limited by the present disclosure.

In the present disclosure, the bus controller is connected to the target device by means of the target bus. The bus controller includes the instruction memory, the instruction memory is used to store one or more instructions, and the instructions correspond to one or more bus sub-operations. The method for the execution of the bus controller includes the following. When an instruction execution command is received, an instruction from an instruction memory is acquired. The instruction is parsed, and one or more corresponding bus sub-operations are then executed. A corresponding control or data operation on a target device is executed by means of the one or more bus sub-operations. The programmable bus controller designed using software instructions uses software instructions to generate the bus timing, so it has the outstanding advantages of high flexibility and good compatibility. By means of writing different instructions into the instruction memory, various types of bus timing, including uncommon and distinct bus timing, may be generated. Corresponding instructions may be flexibly and rapidly configured according to different target devices, such that bus timing that matches a target device is rapidly generated without the need to make any modifications to hardware of the bus controller. In addition, one programmable bus controller can communicate with many target devices, including devices with large differences, by configuring different programs. In this way, only one bus controller may be used to be compatible with most target devices, and good compatibility is thus provided.

In some embodiment of the present disclosure, with reference to FIG. 3, a schematic flow chart of a block of instruction acquisition according to the some embodiments of present disclosure is shown. The acquiring the instruction from the instruction memory when the instruction execution command is received includes the following block.

In block 11, when the instruction execution command is received, instructions in the instruction memory are read in sequence. Herein, each instruction includes an instruction identification code, and the instruction identification code is used to identify the instruction.

In further application of the present disclosure, the instruction may include the instruction identification code. The instruction identification code is a unique number for each instruction and is used to identify different instructions. When the host issues an instruction execution command and the bus controller receives the instruction execution command, the instructions in the instruction memory may be read in sequence. The corresponding content of the instructions in the instruction memory include instruction identification codes. The instructions are distinguished through the different instruction identification codes to achieve the technical effect of distinguishing different instructions.

In the present disclosure, with reference to FIG. 4, a schematic flow chart of blocks of instruction acquisition according to some embodiments of the present disclosure is shown. The instruction includes an operand index, and the method includes the following.

In block 21, after the instruction is acquired, an operand index in the instruction is identified.

In block 22, according to the operand index, a corresponding instruction operand register is called.

Herein, the instruction further includes the operand index. The operand index is used to call the instruction operand register and determine the number of instruction operand registers to be called or one or several specific instruction operand registers. Herein, the instruction operand register stores information related to the instruction operand and includes information of registers such as a target bus operation command register, a target bus operation command byte number register, a target bus address register, a target bus address byte number register, a transmitting data source register, a transmitting data quantity register, a receiving data storage location register, a receiving data quantity register, a program start address register, and a program block execution number register.

In further application of the present disclosure, with reference to FIG. 5, a schematic flow chart of blocks of instruction acquisition according to some embodiments of the present disclosure is shown. The instruction includes a jump enable flag, and the method includes the following.

In block 31, after the instruction is acquired, a jump enable flag in the instruction is identified.

In block 32, a corresponding jump operation is performed according to the jump enable flag.

In practical application of the present disclosure, the instruction also includes the jump enable flag, and the jump enable flag is used to indicate whether jump execution is required. Further, the instruction may also include a jump value to indicate a jump location.

In an application of the present disclosure, the instruction execution control module acquires current instruction execution status information through its dedicated signal connected to the instruction execution module. When the execution of an instruction is completed, the instruction execution control module determines a jump enable flag bit of a current instruction, and when a jump is needed, it jumps to the position corresponding to the jump value. If no jump is required, the instruction execution control module increases a program counter by 1 and reads the next instruction.

In application of the present disclosure, with reference to FIG. 6, a schematic flow chart of blocks of operand transmission according to the some embodiments of present disclosure is shown. The method further includes the following.

In block 41, after the instruction is acquired, an operand in the instruction is identified.

In block 42, the operand is transmitted to a data path control module.

In the format of the instruction in the instruction memory, in addition to the operand index, an operation data field indicating the specific operand may also be included. After decoding, the operand is acquired and sent to the data path control module for the next instruction execution operation.

In further application of the present disclosure, with reference to FIG. 7, a schematic flow chart of blocks of instruction memory address jump according to some embodiments of the present disclosure is shown. The method further includes the following.

In block 51, after the instruction is acquired, a jump value in the instruction is identified.

In block 52, jumping to a specified instruction memory address is performed according to the jump value.

On the other hand, under the instruction format of the present disclosure, in addition to the jump enable flag, a jump value field may also be included. The jump enable flag is used to indicate whether the instruction execution control module needs to jump to execution, and the jump value is used to indicate the specific value that the instruction execution control module needs to jump to. That is, jumping to the specified instruction memory address may be performed according to the jump value, and the corresponding operation starts to be executed.

It is worth noting that in one instruction, the jump enable flag and the jump value have only one numerical value, so the instruction is clear and it is not easily lead to program confusion.

Further, the instruction includes a reserved field, and the reserved field is used to extend the instruction. That is, the reserved field is the field that is not currently defined, allowing a developer to add extensions according to subsequent needs.

In some embodiments, the instruction format of the instruction includes an instruction identification code, the operand index, the operand, the jump enable flag, the jump value, and the reserved field. The instruction constitutes an instruction system, and the instruction system is applied to a combination of one or more bus sub-operations to form a complete instruction set. The technical effect is achieved that there is no need to change the instructions stored in the instruction memory, and the instruction memory only needs to be configured once during system initialization.

In some embodiment, with reference to FIG. 8, a schematic flow chart of a block of instruction writing according to some embodiments of the present disclosure is shown. The method further includes the following block.

In block 61, the instruction corresponding to the bus sub-operation is written into the instruction memory.

In the present disclosure, the host controls the bus controller by means of the local bus, initializes a write address of the instruction memory by means of the bus controller, and writes the instruction to the current write address of the instruction memory. Further, the current write address of the instruction memory is automatically increased by one, pointing to the next unit of the memory. Writing instructions to a write data register of the instruction memory may be repeated until all instructions are written or the instruction memory is filled.

In some embodiment of the present disclosure, with reference to FIG. 9, a schematic flow chart of a block of execution of a bus sub-operation according to some embodiments of the present disclosure is shown. The method further includes the following.

In block 71, a program start address register is set, a program counter is initialized, and the bus sub-operation corresponding to the instruction is executed starting from a specified instruction memory address.

On the other hand, the program start address register is set first and then the program counter is initialized. After receiving a start execution signal sent from a control register, the instruction execution control module starts executing the instructions stored in the instruction memory, that is, executing the bus sub-operations corresponding to the instructions. An address of a first instruction it executes is specified by the program starting address register in an operand register.

In the present disclosure, with reference to FIG. 10, a schematic flow chart of a block of controlling the number of executions according to some embodiments of the present disclosure is shown. The method further includes the following.

In block 81, a program execution number register is set, and the number of executions of the instruction in the instruction memory is controlled.

Further, the program execution number register may be set. If the program execution number register is greater than 0, a value of the program execution number register is decremented by 1, a value of the program counter is set to a value of the program start address register, and then the program is executed again. This cycle continues until the value of the program execution number register decreases to 0, and until all instructions are executed.

In some embodiment of the present disclosure, the bus controller includes registers, and the registers include a control register, a status register, a bus configuration register, an instruction operand register, a storage control register, and an interruption register.

Herein, the storage control registers may include a transmitting data memory write address register, a receiving data memory read address register, a transmitting data register write data register, a receiving data memory read data register, an instruction memory write address register, an instruction memory write data register, etc., which is not particularly limited by the present disclosure.

In further application of the present disclosure, with reference to FIG. 11, a schematic flow chart of blocks of instruction reading of an instruction memory address according to some embodiments of the present disclosure is shown. The method includes the following.

In block 91, a program counter is set in an instruction execution control module.

In block 92, output of the program counter is connected to a read address port of the instruction memory, and an instruction stored in an instruction memory address is read.

In practical applications, the instruction execution control module may be provided with one program counter. The output of the program counter is connected to the read address port of the instruction memory, and the instruction stored in the corresponding address is read. The program counter is mainly used for counting, and when the next instruction is read, the program counter is increased by one.

In order to enable a person having ordinary skill in the art to better understand the present disclosure, a example is provided in the following paragraphs.

The bus controller described in the following paragraphs is provided for the purpose of disclosing as many details as possible, understanding the present disclosure and describing a implementation of the present disclosure. It should not be understood that the present disclosure has only the following implementation method. Other obviously similar implementations derived based on the implementation details disclosed in the following paragraphs also fall within the scope of the present disclosure.

The following description discloses a large number of implementation details, which are only for the purpose of explaining the present disclosure more conveniently. The present disclosure describes a method for execution of a bus controller. These implementation details are not components of the present disclosure, and the present disclosure can exist completely without these implementation details.

I. First, the Following Terms are Described for Reference by a Person Having Ordinary Skill in the Art Host: The host refers to the host machine that MCU, CPU, etc. are connected to the programmable controller through the local bus and used to control the operation of the programmable controller.

Local bus: The local bus refers to the bus used to connect the host and local peripherals such as AXI, AXI-Lite, AHB, APB, and Wishbone. There can be one or more local buses connecting the host computer and the programmable controller. Multiple buses may be of the same type or of different types.

Target bus: The target bus refers to the bus controlled by this bus controller, which can be common peripheral buses and interface buses such as the inter-integrated circuit (I2C), power management bus (PMBus™), serial peripheral interface (SPI), background debug mode (BDM), serial wire debug (SWD), joint test action group (JTAG), universal asynchronous receiver/transmitter (UART), NAND flash interface (NAND), HyperBus™ memory interface (Hyper-Bus™), Xccela™ flash interface (Xccela™).

Target device: The target device refers to the device connected to the bus controller by means of the target bus, and it can be a chip, a circuit board, a device, etc.

Instruction memory: The instruction memory refers to the memory used to store instructions sent by the host, and its implementation may be a set of registers, a static random access memory (SRAM), or other random access storage devices.

Transmitting data memory: The transmitting data memory refers to the memory used to store the data sent by the host and needs to be sent to the target device, and its implementation generally uses random access storage devices such as a static random access memory (SRAM).

Receiving data memory: The receiving data memory refers to the memory used to store the data received by the bus control and sent by the target device, and its implementation generally uses random access memory devices such as a static random access memory (SRAM).

Complete bus operation: A complete bus operation refers to a relatively independent bus operation. For instance, the operation of the SPI bus to write data to a specific address of the target device includes the process of sending commands, sending addresses, sending data, etc. From the bus signal point of view, it is the time period when the chip select (CS) signal is valid.

Program block: A program block refers to a program stored in the instruction memory, starting from a specific address and ending with the execution of the instruction.

II. Overall Structure of the Bus Controller System

As shown in FIG. 2, the largest block in the figure (i.e., the "bus controller" block in the figure) is a implementation of the method for the execution of the bus controller described in the present disclosure. The bus controller is connected to the host by means of the local bus and is connected to the target device by means of the target bus.

The bus controller is formed by modules such as the register module, the instruction execution control module, the instruction storage module, the instruction decoding module, the instruction execution module, the data storage module, and the data path control module. The modules shown in FIG. 2 are logically divided into modules. The implementation is that one module may correspond to multiple physical modules. The module composition of the bus controller is described in detail in the following paragraphs.

1. Register Module

The register module is shown in the table below.

TABLE 1

| Table of types of register modules |
| --- |
| Control register |
| Status register |
| Bus configuration register |
| Instruction operand register |
| Storage control register |
| Interruption register |

The host may access the register module through the local bus, and the register module is connected to multiple modules such as the instruction execution control module, the instruction decoding module, the instruction execution module, and the data path control module. The register module includes six major types of registers: the control register, the status register, the bus configuration register, the instruction operand register, the storage control register, and the interruption register.

(1) Control Register

The host controls the resetting, operating, stopping, and other statuses of the entire programmable controller by reading and writing the control register.

(2) Status Register

Modules such as the instruction execution control module, the instruction decoding module, the instruction execution module, and the data path control module transfer various statuses of the system to the status register. The host may obtain the current programmable controller's operating status, instruction execution status, instruction execution results, error types, error codes, and other status information by reading the status register.

(3) Bus Configuration Register

The host may configure the clock frequency, setup and hold time, data sampling time, and other static bus parameters that are irrelevant to the operation of the instruction system of the target bus by reading and writing the bus configuration register.

(4) Instruction Operand Register

The instruction operand register stores information related to the instruction operand and includes registers such as the target bus operation command register, the target bus operation command byte number register, the target bus address register, the target bus address byte number register, the transmitting data source register, the transmitting data quantity register, the receiving data storage location register, the receiving data quantity register, the program start address register, and the program block execution number register.

Each of the above instruction operand registers may be set to multiple groups, and when the host programs the controller, it can specify which group to use in the instruction. For instance, 4 groups (groups 0 to 3, 4 groups in total) of target bus operand registers may be set. When the host programs the controller, one of its instructions may specify the use of group 0 registers, and another instruction may specify the use of group 1 registers. An instruction uses the operand index contained in the instruction to determine which group of operand registers it needs to use.

(5) Storage Control Register

The storage control register is used to write data to the transmitting data memory or read data back from the receiving data memory. The transmitting data memory write address register, the receiving data memory read address register, the transmitting data register write data register, the receiving data memory read data register, the instruction memory write address register, the instruction memory write data register, etc. are specifically included.

Figure 12:
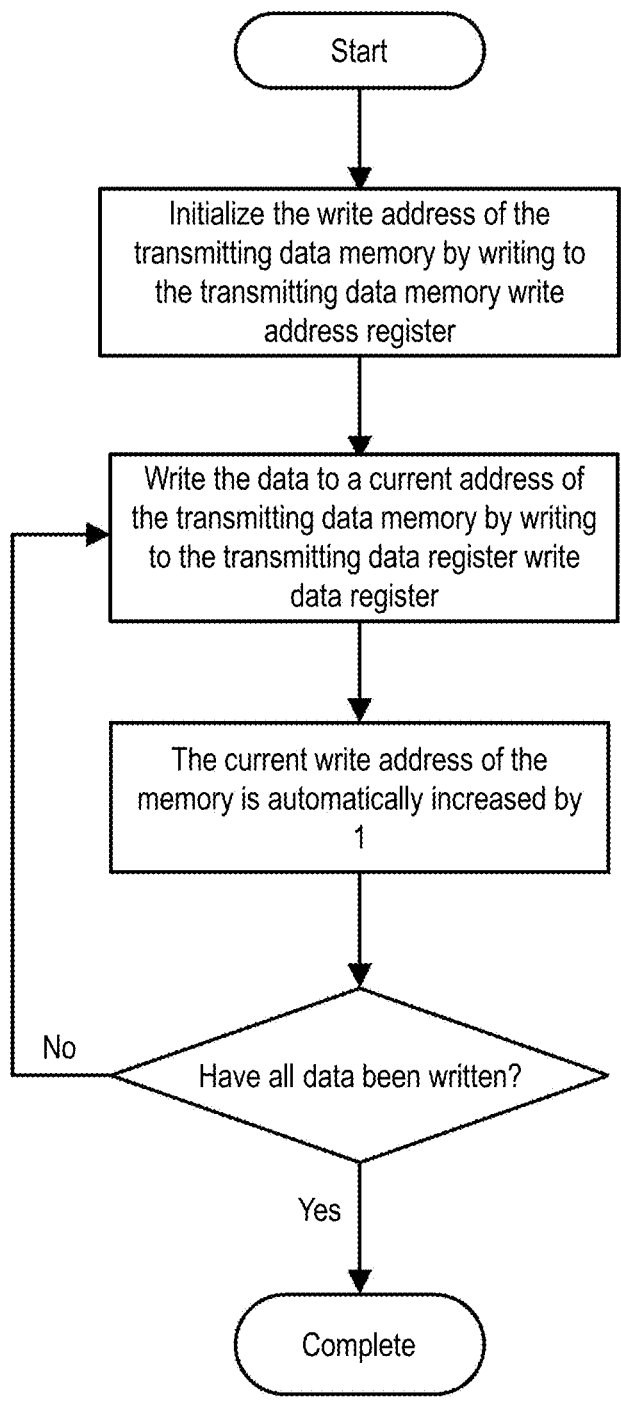
FIG. 12 is a schematic flow chart of a host writing data to a transmitting data memory according to some embodiments of the present disclosure.

The process of the host writing data to the transmitting data memory is shown in FIG. 12. The host initializes the write address of the transmitting data memory by writing to the transmitting data memory write address register. The host then writes the data to a current address of the transmitting data memory by writing to the transmitting data register write data register. Further, the current write address of the transmitting data memory is automatically increased by 1, pointing to the next unit of the memory. In this way, the host may repeatedly write the data to be sent into the write data register of the transmitting data memory until the transmitting data memory is filled or all the data that needs to be transmitted is written.

Figure 13:
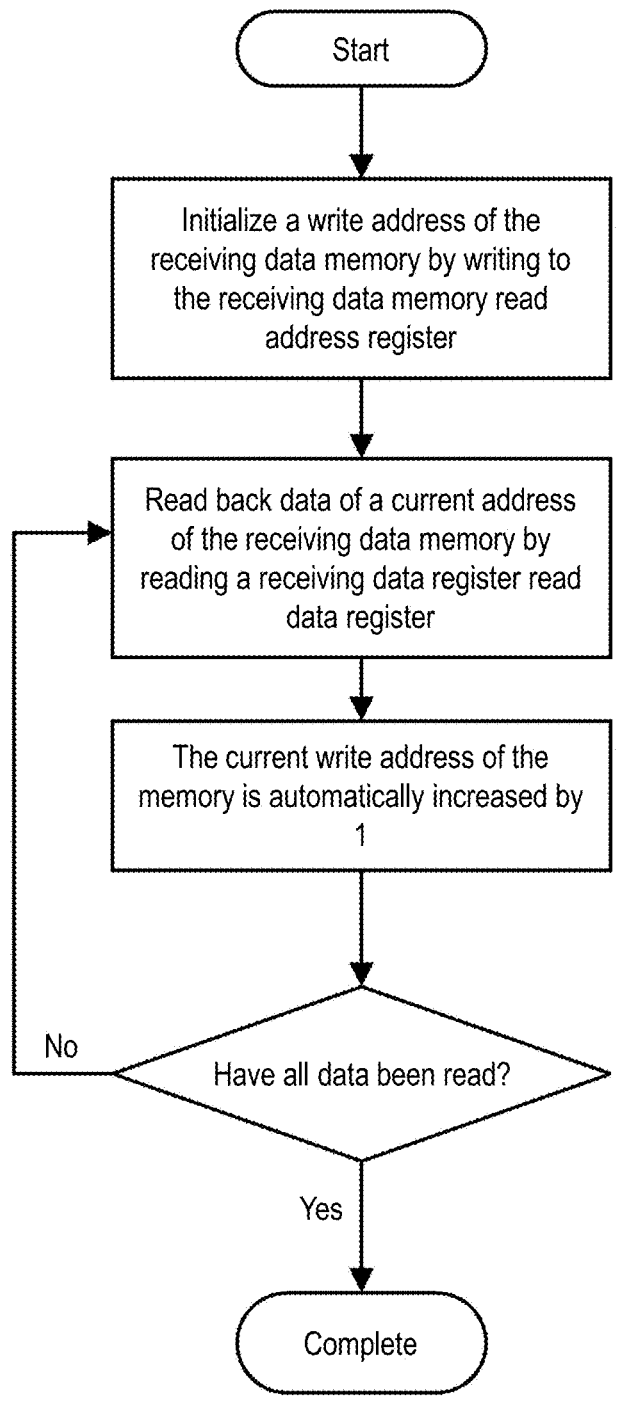
FIG. 13 is a schematic flow chart of a host reading data back from a receiving data memory according to some embodiments of the present disclosure.

The process of the host reading back data from the receiving data memory is shown in FIG. 13. Similarly, the host initializes a read address of the receiving data memory by writing to the receiving data memory read address register. The host then reads data of a current read address of the receiving data memory by reading a receiving data register read data register. Further, the current read address of the receiving data memory is automatically increased by 1, pointing to the next unit of the memory. In this way, the host may read back all the data in the receiving data memory by repeatedly reading the receiving data memory read data register.

Figure 14:
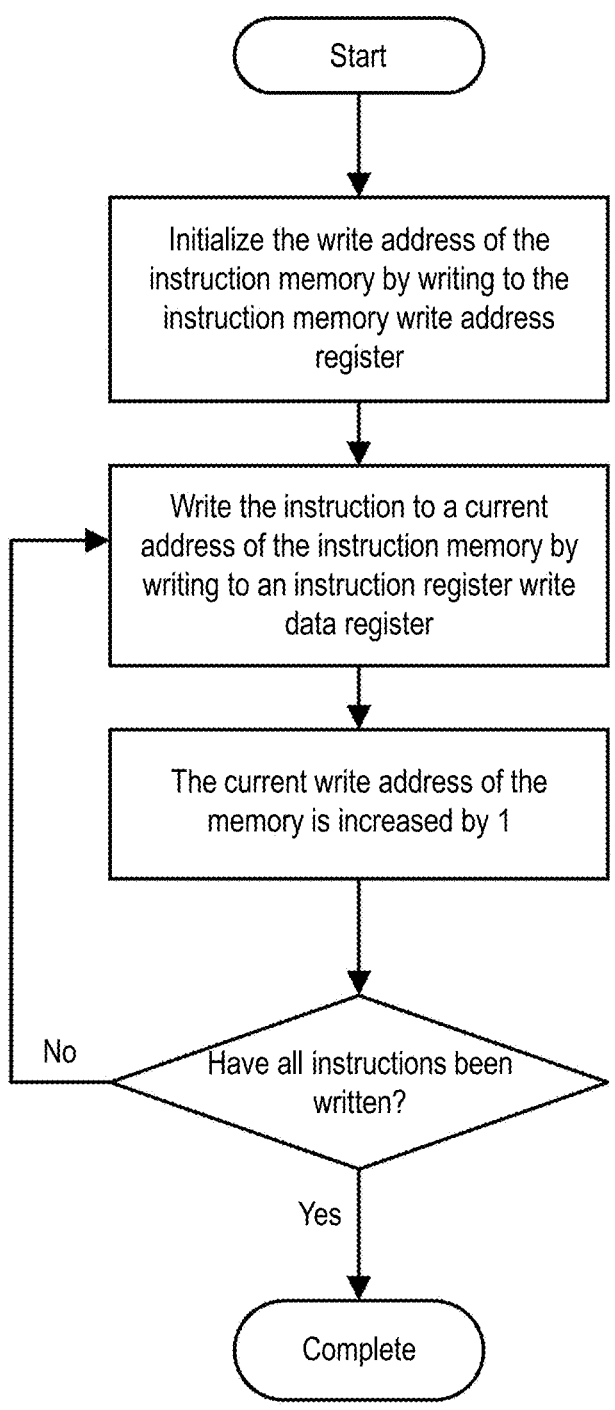
FIG. 14 is a schematic flow chart of a host writing an instruction to an instruction memory according to some embodiments of the present disclosure.

The process of the host writing instructions to the instruction memory is shown in FIG. 14. The process is similar to the process of the host writing data to the transmitting data memory. The host initializes the write address of the instruction memory by writing to the instruction memory write address register. The host then writes the instruction to a current address of the instruction memory by writing to an instruction register write data register. Further, the current write address of the instruction memory is automatically increased by 1, pointing to the next unit of the memory. In this way, the host may repeatedly write instructions into the instruction memory write data register until all instructions are written or the instruction memory is filled.

(6) Interruption Register

This bus controller may initiate an interruption request to the host through an interruption signal connected to the host. The interruption control register is used to configure interruption enable, configure the interruption type, mask/enable the interruption source, read the interruption status, clear interruption, etc.

2. Instruction Execution Control Module

Figure 15:
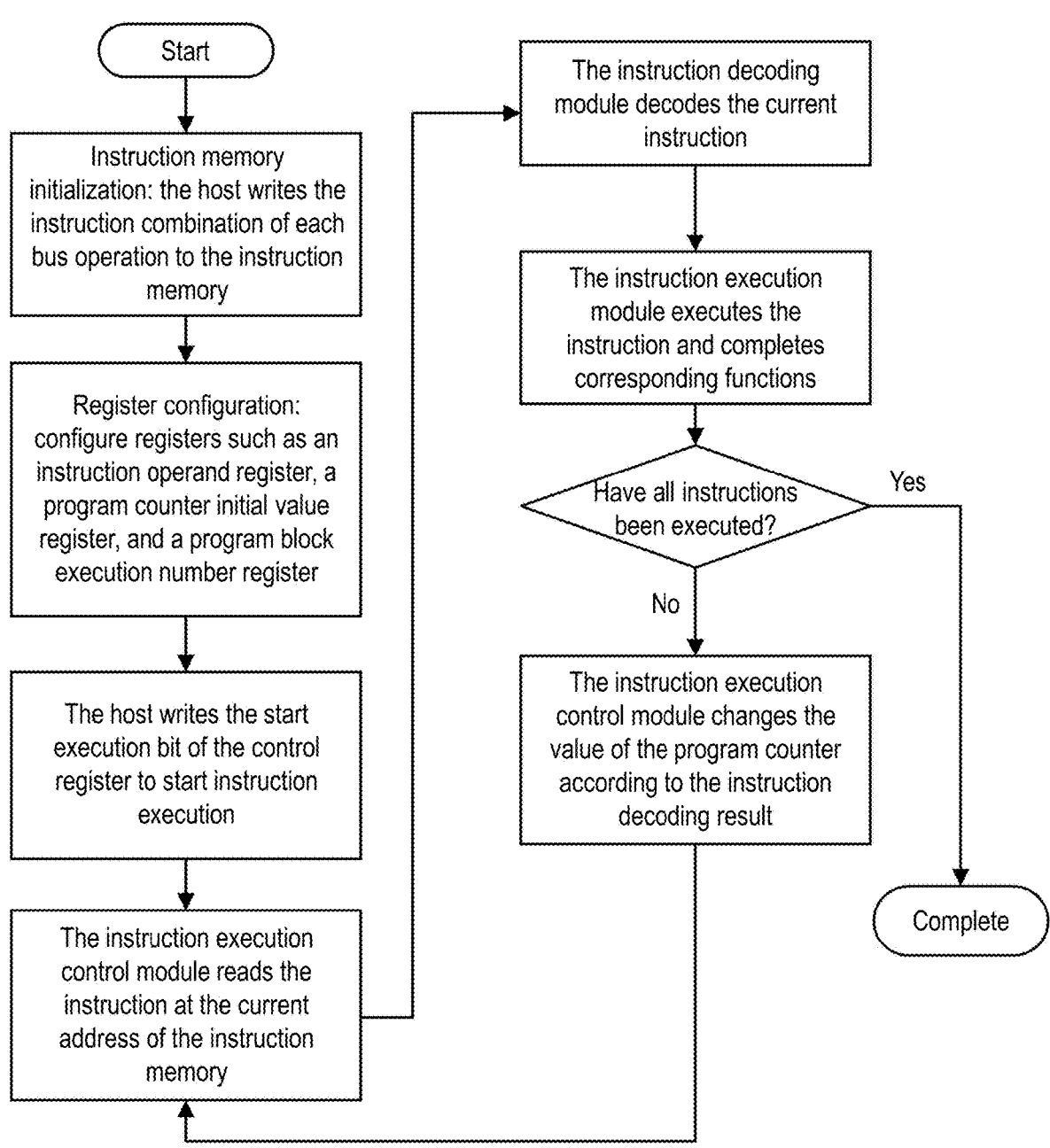
FIG. 15 is a schematic flow chart of a work flow of a bus controller system according to some embodiments of the present disclosure.

The instruction execution control module controls the entire process of reading instructions from the instruction memory, decoding the instructions, and executing the instructions. The workflow of the bus controller system is shown in FIG. 15.

After receiving the start execution signal sent from the control register, the instruction execution control module starts executing the instructions stored in the instruction memory. The address of the first instruction it executes is specified by the program starting address register in the operand register.

One program counter (PC) is set in the instruction execution control module. The output of the program counter is connected to the read address port of the instruction memory, and the instruction stored in the corresponding address is read. The instruction execution control module acquires the current instruction execution status information through its dedicated signal connected to the instruction execution module. When the execution of one instruction is completed, the instruction execution control module determines the jump enable flag of the current instruction. If no jump is required, the instruction execution control module increases the program counter by 1 and reads the next instruction. If a jump is required, the instruction execution control module adds or subtracts the program count to the jump value specified in the jump value field of the current instruction, and reads the next instruction. When the instruction execution control module reads the end execution instruction, all instructions in the current program block are executed. Herein, the instruction execution control module determines the setting of the program block execution number register in the instruction operand register. If the program block execution number register is greater than 0, the instruction execution control module decreases the value of the program block execution number register by 1, and at the same time sets the value of the program counter to the value of the program start address register, and then executes the program block again. This cycle continues until the value of the program block execution number register is reduced to 0, all instructions are executed, and the instruction execution control module enters the idle state.

The above instruction execution control module explains the basic principles and basic implementation methods of instruction execution control. Depending on the target bus and the different requirements for the performance of the bus controller, the instruction execution control module may also be implemented using a two-stage or multi-stage pipeline.

3. Instruction Decoding Module

The instruction decoding module receives instructions read from the instruction memory and decodes the instructions. The instruction decoding generates information such as the instruction identification code, the target bus operation command register index, the target bus operation command byte number register index, the target bus address register index, the target bus address byte number register index, the transmitting data source register index, the transmitting data quantity register index, the receiving data storage location register index, and the receiving data quantity register index. The information obtained by decoding these instructions is passed to the instruction execution module and the data path control module.

4. Instruction Execution Module

The instruction execution module is responsible for the specific execution of the instruction and is responsible for generating the bus timing specified by the instruction. The instruction execution module generates the bus static parameters such as the bus clock frequency, controls setup and hold time of the sent data, and controls the sampling time of the received data according to the settings of the bus configuration register.

The instruction execution module generates the target bus timing corresponding to the instruction based on the instruction identification code and the operand passed by the instruction decoding module, the operand passed by the data path control module, and the control information passed by the instruction execution control module.

5. Instruction Storage Module

The instruction storage module is used to store instructions sent by the host and is formed by the instruction memory and some necessary digital logic circuits to access the instruction memory. The implementation of the instruction memory may be a set of registers, a static random access memory (SRAM), or other random access storage devices.

6. Data Storage Module

The data storage module is formed by the transmitting data memory, the receiving data memory, and some necessary digital logic circuits to access them. The transmitting data memory and the receiving data memory are respectively used to store the transmitting data sent by the memory host and the received data read back from the target device. There can be multiple transmitting data memories and multiple receiving data memories. For instance, two transmitting data memories may be used to form a ping-pong structure to improve data transmission efficiency. The instruction specifies which memory to use by specifying an index into either the transmitting data memory or the receiving data memory.

7. Data Path Control Module

The data path control module generates specific operands based on the instruction identification code, the operand index, and other information provided by the instruction decoding module, and sends them to the instruction execution module. The data path control module determines which group of target bus operation command registers to use based on the target bus operation command register index obtained by instruction decoding, determines which group of target bus address registers to use based on the target bus address register index, determines which send data memory to be used based on the send data memory index, and so on, and passes these data to the instruction execution module.

III. Instruction System of the Present Disclosure

The bus controller accesses the target device through a pre-agreed protocol. One complete bus operation is often composed of sending reset timing, sending operation start timing, sending operation commands, sending read and write flag bits, sending addresses, sending data, sending operation end timing, receiving response bits, receiving data, and other processes (i.e., bus sub-operations). Some bus operations only have one of the above bus sub-operations, some bus operations include some of the bus sub-operations, some bus operations include the same several bus sub-operations but in different combination orders, some bus operations repeats a specific bus sub-operation multiple times, and so on.

The core design idea of this bus controller instruction system is to use one instruction to implement a combination of one or several of the above bus sub-operations and to use another instruction to implement a combination of one or more bus sub-operations, and so on. Multiple different instructions are implemented according to different needs, and finally complete instruction set is formed. One complete bus operation may be implemented through one instruction or a combination of multiple instructions.

In the design of conventional bus controllers, a bus operation is fixed and is not split into smaller processes that can be controlled by instructions, does not have an instruction system, and cannot be programmed. For instance, assuming that the target bus write data operation frame format is as shown in Table 2, the conventional bus controller implements this operation as an atomic operation. CMD is sent first, DUMMY is then sent, ADDR is then sent until DATAn is sent, and this operation is fixed and unchangeable.

TABLE 2

Target bus write data operation frame format

| CMD | DUMMY | ADDR | DATA0 | DATA1 | ... | DATAn |
|-----|-------|------|-------|-------|-----|-------|

It is assumed that the target bus write data operation frame format is shown in Table 2. When designing instructions, the bus timing of sending CMD, sending DUMMY, sending ADDR, sending DATA, and other processes may be implemented with one instruction each, which are called SEND_CMD, SEND_DUMMY, SEND_ADDR, and SEND_DATA instructions respectively. Each instruction contains an instruction identification code to distinguish different instructions. When the system needs to perform a complete write data bus operation, the SEND_CMD, SEND_DUMMY, SEND_ADDR, and SEND_DATA instructions may be written to the instruction memory in sequence. The instructions in the instruction memory are then executed, and the bus controller may generate a complete write data bus operation timing.

In the content of the above instruction, the specific value of CMD, the number of DUMMY, the specific value of ADDR, and the specific value of DATA may or may not be included in the command itself. These values may be stored in the instruction operand register or the transmitting data memory, and the instruction only needs to contain the index of these instruction operand registers or the transmitting data memory. The data path control module reads the value of the corresponding operand register based on these index information and passes these operands to the instruction execution module. The advantage of this design is that when the values of CMD, ADDR, DATA, etc. change, only the corresponding instruction operand registers need to be changed, and the instructions themselves does not need to be changed. Because the instructions do not need to be changed, there is no need to change the instructions stored in the instruction memory, so the instruction memory only needs to be configured once during system initialization.

Using the above method, the instruction combinations corresponding to all or part of the bus operations may be written into the instruction memory during system initialization. When the system needs to call a specific bus operation, it only needs to execute the instruction from the corresponding instruction memory address.

TABLE 3

Instruction format of the present disclosure

| instruction identification code | operand index | operand | jump enable field | jump value | reserved field |
|--------------------------------|---------------|---------|-------------------|------------|----------------|

The format of the instructions in the present disclosure is shown in Table 3. The instruction identification code is a field that an instruction must contain, and it is used to distinguish different instructions. The remaining fields are optional. If the instruction includes an operand index field, there can be one or more operand fields, which are used to determine the operand register that the instruction needs to use. If the instruction includes an operand field, there can be one or more operand fields, and these fields are directly provided to the data path control module after the instruction is decoded. If the instruction includes a jump enable field, there can be only one jump enable field, which is used to indicate whether the instruction execution control module needs to jump to execution. If the instruction includes a jump value field, there can be only one jump value field, which is used to indicate the specific value that the instruction execution control module needs to jump to. The reserved field is the field that is not currently defined and may be used by future extension to the instruction.

In the present disclosure, the programmable bus controller designed using software instructions uses software instructions to generate the bus timing, so it has the outstanding advantages of high flexibility and good compatibility. By means of writing different instructions into the instruction memory, various types of bus timing, including uncommon and distinct bus timing, may be generated. Corresponding operation instructions may be flexibly and rapidly configured according to different target devices, such that bus timing that matches a target device is rapidly generated without the need to make any modifications to hardware of the bus controller. One programmable bus controller can communicate with many target devices, including devices with large differences, by configuring different programs. In this way, only one bus controller may be used to be compatible with most target devices. This is an advantage that bus controllers designed based on conventional digital logic circuit design methods cannot achieve.

It should be noted that, for the sake of convenience of description, the method embodiments are expressed as a series of action combinations. However, a person having ordinary skill in the art should know that the present disclosure is not limited by the sequence of actions described, because according to the present disclosure, certain blocks may be performed in other orders or simultaneously. Further, a person having ordinary skill in the art should also know that the embodiments described in the specification are selectable embodiments, and the actions involved are not necessarily necessary for the present disclosure.

Figure 16:
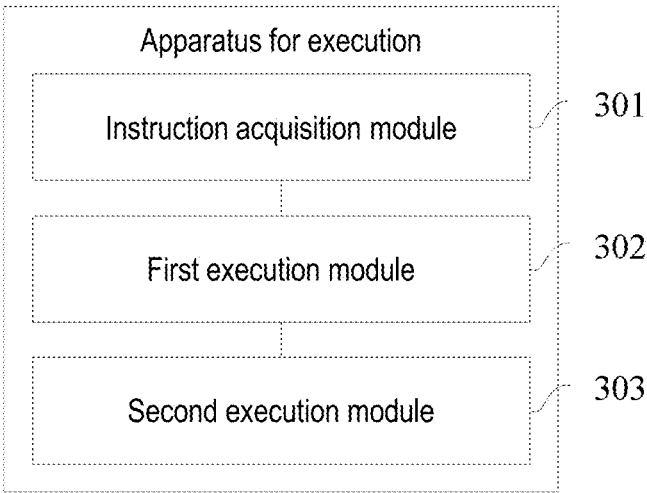
FIG. 16 is a structural block diagram of an apparatus for execution of a bus controller according to some embodiments of an embodiment of the present disclosure.

With reference to FIG. 16, a structural block diagram of an apparatus for execution of a bus controller according to an embodiment of the present disclosure is shown. The bus controller is connected to a target device by means of a target bus. The bus controller includes an instruction memory, the instruction memory is used to store one or more instructions, and the instruction corresponds to one or more bus sub-operations. The following modules may be included:

An instruction acquisition module 301 is configured to acquire an instruction from an instruction memory when an instruction execution command is received.

A first execution module 302 is configured to parse the instruction and then execute one or more corresponding bus sub-operations.

A second execution module 303 is configured to execute a corresponding control or data operation on a target device by means of the one or more bus sub-operations.

In some embodiments, the bus sub-operation includes sending reset timing, sending operation start timing, sending an operation command, sending a read and write flag bit operation, sending an address operation, sending a data operation, sending operation end timing, receiving a response bit operation, and receiving a data operation.

In some embodiments, the instruction acquisition module includes the following module.

An instruction reading submodule is configured to sequentially read the instructions in the instruction memory when receiving an instruction execution command, where each instruction includes an instruction identification code, and the instruction identification code is used to identify the instruction.

In some embodiments, the instruction includes an operand index, and the apparatus includes the following modules.

An operand index identification module is configured to identify an operand index in the instruction after the instruction is acquired.

An instruction operand register calling module is configured to call a corresponding instruction operand register according to the operand index.

In some embodiments, the instruction includes a jump enable flag, and the apparatus includes the following modules.

A jump enable identification module is configured to identify a jump enable flag in the instruction after the instruction is acquired; and A jump operation execution module is configured to perform a corresponding jump operation according to the jump enable flag.

In some embodiments, the apparatus further includes the following module.

An instruction writing module is configured to write instruction corresponding to the bus sub-operation into the instruction memory.

In some embodiments, the apparatus further includes the following module.

An execution module is configured to set a program start address register, initialize a program counter, and execute the bus sub-operation corresponding to the instruction starting from a specified instruction memory address.

In some embodiments, the apparatus further includes the following module.

An execution number control module is configured to set a program execution number register and control the number of executions of the instruction in the instruction memory.

In some embodiments, the bus controller includes registers, and the registers include a control register, a status register, a bus configuration register, an instruction operand register, a storage control register, and an interruption register.

In some embodiments, the bus controller is connected to a host through a local bus.

In some embodiments, the apparatus includes the following modules.

An operand identification module is configured to identify an operand in the instruction after the instruction is acquired.

An operand transmitting module is configured to transmit the operand to a data path control module.

In some embodiments, the apparatus includes the following modules.

A jump value identification module is configured to identify a jump value in the instruction after the instruction is acquired.

An address jump module is configured to jump to a specified instruction memory address according to the jump value.

In some embodiments, the instruction includes a reserved field, and the reserved field is used to extend the instruction.

In some embodiments, the instruction forms an instruction system.

In some embodiments, the apparatus includes the following modules.

A program counter module is configured to set a program counter in an instruction execution control module.

An instruction memory address instruction reading module is configured to connect output of the program counter to a read address port of the instruction memory and read an instruction stored in an instruction memory address.

Each module in the apparatus for the execution of the bus controller may be implemented in whole or in part by software, hardware, and combinations thereof. Each of the above modules may be embedded in or independent of the processor of the computer device in the form of hardware, or may be stored in the memory of the computer device in the form of software, so that the processor can call and execute the operations corresponding to the above modules.

The apparatus for the execution of the bus controller provided above may be used to execute the method for the execution of the bus controller provided in any of the above embodiments and has corresponding functions and beneficial effects.

In an embodiment, a bus controller is provided. The bus controller is connected to a target device by means of a target bus. The bus controller includes an instruction memory, the instruction memory is used to store one or more instructions, and the instruction corresponds to one or more bus sub-operations. The bus controller includes the following modules.

An instruction acquisition module is configured to acquire an instruction from an instruction memory when an instruction execution command is received.

A first execution module is configured to parse the instruction and then execute one or more corresponding bus sub-operations.

A second execution module is configured to execute a corresponding control or data operation on a target device by means of the one or more bus sub-operations.

Figure 17:
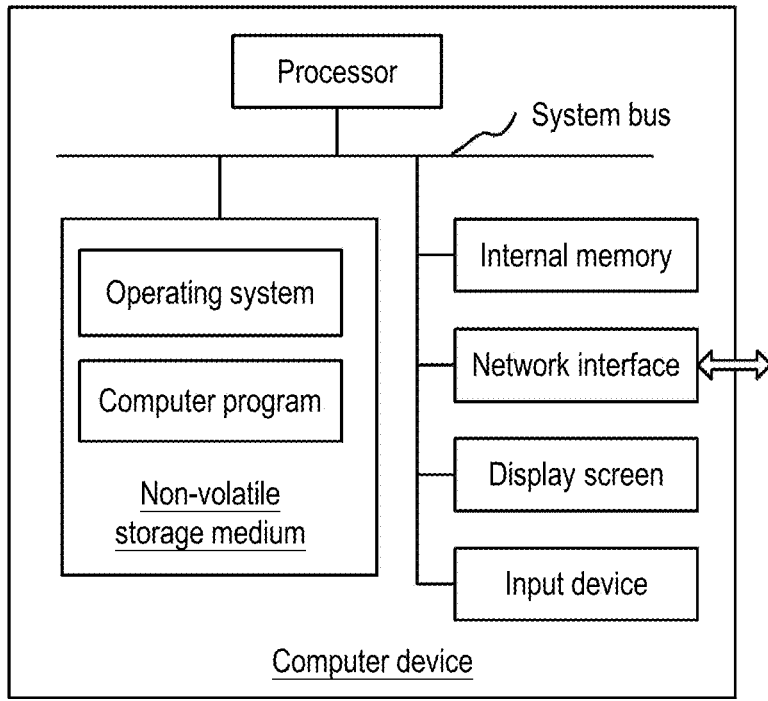
FIG. 17 is an internal structural diagram of a computer device according to some embodiments of the present disclosure.

In an embodiment, a computer device is provided. The computer device may be a terminal, and its internal structure diagram may be as shown in FIG. 17. The computer device includes a processor, a memory, a network interface, a display screen, and an input device connected by a system bus. Herein, the processor of the computer device is used to provide computing and control capabilities. The memory of the computer device includes a non-volatile storage medium and an internal memory. The non-volatile storage medium stores an operating system and a computer program. The internal memory provides an environment for the execution of the operating system and the computer program in the non-volatile storage medium. The network interface of the computer device is used to communicate with external terminals through a network connection. The computer program implements a method for execution of a bus controller when being executed by the processor. The display screen of the computer device may be a liquid crystal display or an electronic ink display. The input device of the computer device may be a touch layer overlaid on the display screen and can also be a button, a trackball or a touch pad provided on the computer device housing, or can an an external keyboard, touch pad, or mouse.

A person having ordinary skill in the art can understand that the structure shown in FIG. 17 is only a block diagram of a partial structure related to the solution of the present application and does not constitute a limitation on the computer device to which the solution of the present application is applied. Particular computer devices may include more or fewer components than shown in the figures, some combinations of components, or have different arrangements of components.

In an embodiment, a computer device including a memory and a processor is provided, and the memory stores a computer program. The processor implements the blocks of the embodiments of FIG. 1 to FIG. 17 when executing the computer program.

In an embodiment, a computer-readable storage medium storing a computer program is provided. The computer program executes the blocks of the embodiments of FIG. 1 to FIG. 17 when being executed by the processor.

Each embodiment is described in a progressive manner. Each embodiment focuses on its differences from other embodiments, and the same or similar parts among various embodiments may be referred to one another.

A person having ordinary skill in the art shall understand that embodiments of the present disclosure may be provided as methods, devices, or computer program products. Accordingly, the present disclosure may take the form of an entirely hardware embodiment, an entirely software embodiment, or an embodiment that combines software and hardware aspects. Further, the present disclosure may take the form of a computer program product embodied on one or more computer-usable storage media (including but not limited to a disk memory, a CD-ROM, an optical storage device, etc.) having computer-usable program code embodied therein.

The present disclosure is described with reference to flow charts and/or block diagrams of the methods, terminal devices (systems), and computer program products according to embodiments of the present disclosure. It should be understood that each process and/or block in each flow chart and/or block diagram, and the combination of processes and/or blocks in the flow charts and/or block diagrams may be implemented by computer program commands. These computer program commands may be provided to the processor of a general-purpose computer, a special-purpose computer, an embedded processor, or other programmable data processing terminal devices to produce a machine. In this way, the commands executed by the processor of the computer or other programmable data processing terminal devices generate a device for implementing the functions specified in one or more processes in the flow chart and/or one or more blocks in the block diagram.

These computer program commands may also be stored in a computer-readable memory that may guide a computer or other programmable data processing terminal devices to work in a specific manner. In this way, the commands stored in the computer-readable memory generate an article of manufacturing including the command device. The command device implements the functions specified in one or more processes in the flow chart and/or one or more blocks in the block diagram.

These computer program commands may also be loaded onto a computer or other programmable data processing terminal devices, so that a series of operation steps may be executed on the computer or other programmable terminal devices to generate processing of computer implementation. As such, the commands executed on the computer or other programmable terminal devices provide blocks for implementing the functions specified in one or more processes in the flow chart and/or one or more blocks in the block diagram.

Although the embodiments of the present disclosure have been described, a person having ordinary skill in the art can make additional changes and modifications to these embodiments once the basic inventive concepts are apparent. Therefore, it is intended that the appended claims be construed to include the embodiments and all changes and modifications that fall within the scope of the present disclosure.

Finally, relational terms such as "first" and "second" are only used to indicate the distinction between an entity or operation and another entity or operation, and do not necessarily require or imply any such actual relationship or order between these entities or operations. Moreover, the terms "including", "comprising", or any other variations thereof are intended to cover non-exclusive inclusion, so that a process, method, object, or terminal device including a series of elements includes not only those elements, but also other elements that are not explicitly listed, or includes elements inherent to the process, method, object, or terminal device. If there are no more restrictions, the element defined by the sentence "including a . . . " does not exclude the existence of other identical elements in the process, method, article, or terminal device that includes the element.

A method for execution of a bus controller, an apparatus for execution of a bus controller, a computer device, and a storage medium are introduced in detail in the above paragraphs. Examples are used to illustrate the principles and implementation modes of the present disclosure in the specification, and the descriptions of the above embodiments are only used to help understand the method and the core idea of the present disclosure. Further, for a person having ordinary skill in the art, according to the idea of the present disclosure, there will be changes in the implementation and application scope. In view of the above, the content shall not be construed as limitations of the present disclosure.

What is claimed is:

1. A method for execution of a bus controller, wherein the bus controller is connected to a target device by means of a target bus, the bus controller comprises an instruction memory, the instruction memory is used to store at least one instruction, the instruction corresponds to one or more bus sub-operations, and wherein the method comprises:

in response to receiving an instruction execution command, acquiring a target instruction of the at least one instruction from the instruction memory;

parsing the target instruction and then executing one or more corresponding bus sub-operations;

executing a corresponding control or data operation on the target device by means of the one or more bus sub-operations, wherein, the bus sub-operation comprises sending reset timing, sending operation start timing, sending an operation command, sending a read and write flag bit operation, sending an address operation, sending a data operation, sending operation end timing, receiving a response bit operation, and receiving a data operation.

2. The method for the execution according to claim 1, wherein the bus controller is connected to a host through a local bus.

3. The method for the execution according to claim 1, wherein in response to receiving an instruction execution command, acquiring a target instruction of the at least one instruction from the instruction memory comprises:

in response to receiving an instruction execution command, reading instructions in the instruction memory in sequence; wherein, each instruction in the instruction memory comprises an instruction identification code, the instruction identification code is used to identify the instruction in the instruction memory.

4. The method for the execution according to claim 1, wherein the target instruction comprises an operand index, the method comprises:

identifying the operand index in the target instruction in response to acquiring the target instruction;

calling an instruction operand register which corresponds to the operand index.

5. The method for the execution according to claim 1, wherein the target instruction comprises a jump enable flag, the method comprises:

identifying the jump enable flag in the target instruction in response to acquiring the instruction;

performing a jump operation which corresponds to the jump enable flag.

6. The method for the execution according to claim 1, wherein the method comprises:

identifying an operand in the target instruction in response to acquiring the target instruction;

transmitting the operand to a data path controller.

7. The method for the execution according to claim 4, wherein the method comprises:

identifying a jump value in the target instruction in response to acquiring the instruction;

jumping to a specified instruction memory address according to the jump value.

8. The method for the execution according to claim 1, wherein the target instruction further comprises a reserved field, the reserved field is used to extend the target instruction.

9. The method for the execution according to claim 1, wherein the method further comprises:

writing the target instruction corresponding to the bus sub-operation into the instruction memory.

10. The method for the execution according to claim 1, wherein the method further comprises:

setting a program start address register, initializing a program counter, and executing the bus sub-operation corresponding to the target instruction starting from a specified instruction memory address.

11. The method for the execution according to claim 1, wherein the method further comprises:

setting a program execution number register, and controlling a number of executions of the target instruction in the instruction memory.

12. The method for the execution according to claim 1, wherein the method comprises:

setting a program counter in an instruction execution controller;

connecting an output of the program counter to a read address port of the instruction memory, and reading the instruction stored in an instruction memory address.

13. A computer device, comprising a memory and a processor, the memory storing a computer program, wherein the processor implements blocks of a method for execution of a bus controller in response to executing the computer program, the bus controller is connected to a target device by means of a target bus, the bus controller comprises an instruction memory, the instruction memory is used to store at least one instruction, the instruction corresponds to one or more bus sub-operations, and wherein the method comprises:

in response to receiving an instruction execution command, acquiring a target instruction of the at least one instruction from the instruction memory;

parsing the target instruction and then executing one or more corresponding bus sub-operations;

executing a corresponding control or data operation on the target device by means of the one or more bus sub-operations, wherein, the bus sub-operation comprises sending reset timing, sending operation start timing, sending an operation command, sending a read and write flag bit operation, sending an address operation, sending a data operation, sending operation end timing, receiving a response bit operation, and receiving a data operation.

14. A non-transitory computer-readable storage medium, storing a computer program, wherein the computer program implements blocks of a method for execution of a bus controller in response to being executed by a processor, the bus controller is connected to a target device by means of a target bus, the bus controller comprises an instruction memory, the instruction memory is used to store at least one instruction, the instruction corresponds to one or more bus sub-operations, and wherein the method comprises:

in response to receiving an instruction execution command, acquiring a target instruction of the at least one instruction from the instruction memory;

parsing the target instruction and then executing one or more corresponding bus sub-operations;

executing a corresponding control or data operation on the target device by means of the one or more bus sub-operations, wherein, the bus sub-operation comprises sending reset timing, sending operation start timing, sending an operation command, sending a read and write flag bit operation, sending an address operation, sending a data operation, sending operation end timing, receiving a response bit operation, and receiving a data operation.

15. A method for execution of a bus controller, wherein the bus controller is connected to a target device by means of a target bus, the bus controller comprises an instruction memory, the instruction memory is used to store at least one instruction, the instruction corresponds to one or more bus sub-operations, and wherein the method comprises:

in response to receiving an instruction execution command, acquiring a target instruction of the at least one instruction from the instruction memory;

parsing the target instruction and then executing one or more corresponding bus sub-operations;

executing a corresponding control or data operation on the target device by means of the one or more bus sub-operations, wherein the bus controller comprises registers, the registers comprise a control register, a status register, a bus configuration register, an instruction operand register, a storage control register, and an interruption register.

\* \* \* \* \*